Jan. 31, 1933. H. W. AHRENS 1,895,435
FEEDER FOR LITTLE PIGS
Filed March 10, 1931
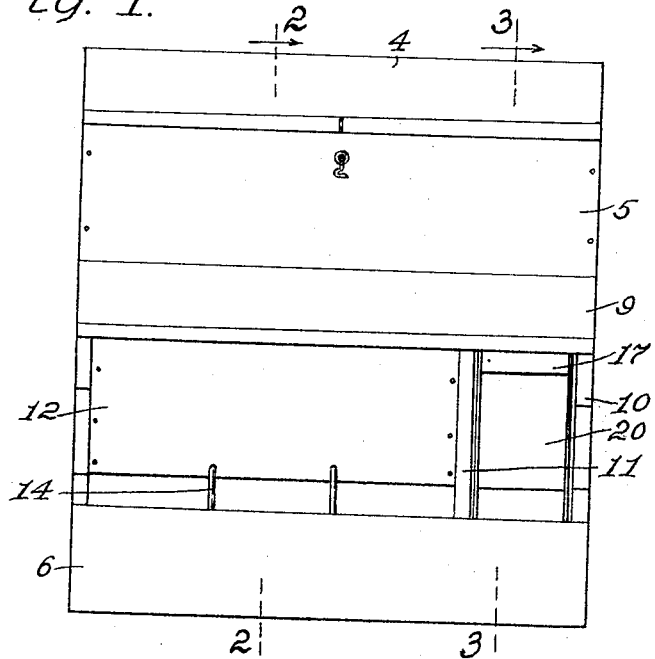
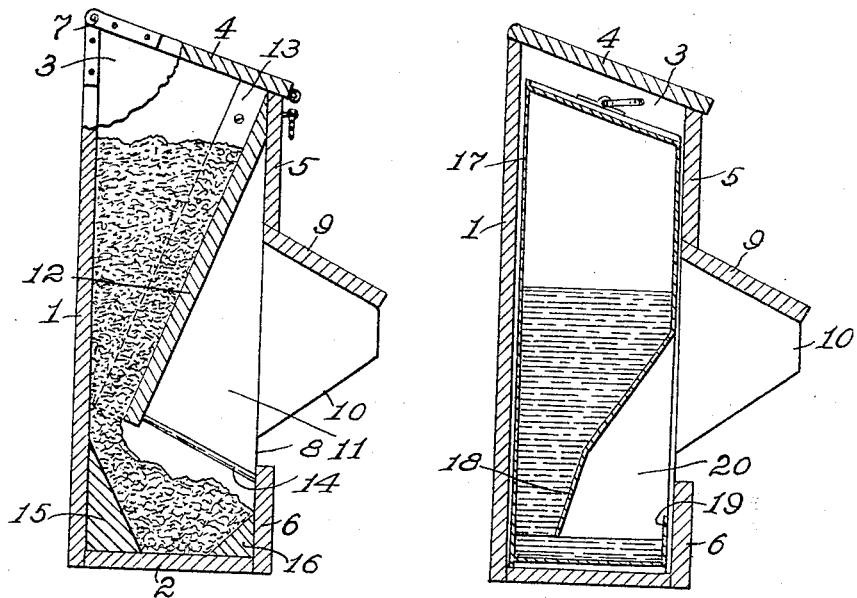
Fig. 1.
Fig. 2.
Fig. 3.
INVENTOR
Henry W. Ahrens,
BY
G. C. Kennedy
ATTORNEY Patented Jan. 31, 1933

1,895,435

UNITED STATES PATENT OFFICE

HENRY W. AHRENS, OF SOUTH AMANA, IOWA

FEEDER FOR LITTLE PIGS

Application filed March 10, 1931. Serial No. 521,502.

My invention relates to improvements in feeders for little pigs, and the object of my improvement is to supply a device of this class of a construction suitable for permitting little pigs to feed therefrom without interference by the sow or larger hogs.

Another object of my improvements is to combine with the device compartmental means and a watering fount available for use in conjunction with the feeding apparatus in another compartment separated therefrom whereby the little pigs may drink as well as feed under the same shelter and protection as is afforded by my new construction.

These objects have been accomplished by the means which are hereinafter described and claimed, and which are illustrated in the accompanying drawing, in which Fig. 1 is a front elevation of my device. Fig. 2 is a front to rear section of the device taken on the broken line 2—2 of said Fig. 1, and Fig. 3 is another front to rear section of the device taken on the broken line 3—3 of Fig. 1.

When ordinary feeding troughs or other devices are provided from which both sows and their progeny are to feed in common, the sow usually crowds away the little pigs, or otherwise interferes with them as to prevent their feeding, and may injure them in doing so. I have therefore provided a feeding device accessible for feeding for little pigs only, where they may not be thus menaced or prevented from eating, and the device may be placed suitably also for access where the sow cannot approach closely as to maim or injure the pigs.

The device may be of any dimensions or shape proper for the above functions. Usually it is made simply as shown in the figures, for convenience and economy in manufacture and of a size small enough to stow in some restricted space where the sow cannot enter in approaching it, but where the little pigs can find entrance without difficulty.

The numeral 1 denotes the rear wall of the feeder housing, 2 is the imperforate bottom, 3 the opposite side walls, 4 a forwardly sloping cover hinged at 7, and 5 and 6 respectively upper and lower sections of the front wall separated by a longitudinal gap at 8, the lower part 6 then serving as a ledge or wall part of a feeder trough in the housing bottom separated by a partition 11 from a watering compartment.

The feeder compartment has preferably front and back corner filler-blocks 16 and 15 respectively, to shape the feeder trough with a narrowed lower part for raising the general level of the feed received thereinto. Within the feed compartment is a fixed and rearwardly sloping hopper member 12 with contracted bottom opening to deliver feed into said trough as indicated in Fig. 2.

Below the front upper member 5 of the front wall, a forwardly and downwardly inclined canopy 9 is fixed longitudinally across the device projecting over the gap 8 but allowing access thereunder for little pigs only, as a full grown hog is debarred thereby. Side plates 10 depend from the ends of the canopy, to close the sides at and below the canopy, so that large hogs cannot crowd in from the sides. A pair of inclined rods 14 cross the open upper end of the feed trough from the ledge 6 to the lower part of the hopper member 12, serving to keep the pigs from trespassing upon each other's feeding areas, and also from crowding upon each other. The canopy 9 with its end members 10 also serves as shelter for the pigs when feeding and to deflect rain from entering the trough.

As it is convenient for the pigs to have access to a drinking fount while under this canopy, I have provided another compartment in the device by use of the partition 11, and large enough only to receive the inverted vacuum-controlled fountain device 17, removably, whose contracted depending spout 18 delivers into a bottom tank 19, so that a pig may drink therefrom by way of the recess 20. Nothing is claimed herein for this fountain construction, but the use of a fountain device in the extra compartment, with access to the same by feeding pigs, is thought to be convenient and economical, rendering it unnecessary to provide a separate contrivance for that purpose. The feeding and drinking combination device of my invention is preferably constructed of wood, but may be made of other materials in whole or in part, as desired.

Having described my invention, what I claim as new, and desire to secure by Letters Patent, is:

1. A feeder for little pigs, comprising in combination, a housing having a vertically disposed front wall consisting of upper and lower sections in one plane spaced apart, the lower section being a trough front wall, a hopper wall within the housing inclined rearwardly to open above the floor of the trough, a filler body below and spaced from the hopper mouth to receive and deliver feed from the hopper mouth forwardly into the trough, division devices across the upper part of the trough from the lower front wall section to the lower part of the hopper front wall, and a closed end inclined canopy leading from the lower part of the upper front wall section forwardly, the closed end parts extending downwardly substantially to the upper edge of the lower wall section, whereby little pigs only have access to the trough under the canopy and under its ends.

2. A device of the character described, comprising in combination, a housing having a vertically disposed front wall consisting of upper and lower sections in one plane spaced apart, the lower section being a trough front wall, a hopper wall within the housing inclined rearwardly to open above the floor of the trough, division rods fastened across the mouth of the trough between the front wall thereof and the lower end of the hopper, a transverse partition in the housing providing a separate compartment therein, a water container within said compartment, vacuum-controlled and having an open fount in the lower part of the compartment below said lower front wall section and to receive water from the vacuum-controlled part of the container, and an inclined canopy projecting forwardly from the lower edge of the upper front wall section and having end walls extending below it approximately to the upper edge of the lower front wall sections, said canopy and its lower ends limiting access thereunder to little pigs only.

In testimony whereof I affix my signature.

HENRY W. AHRENS.